United States Patent
Van Lieshout et al.

(10) Patent No.: US 10,278,096 B2
(45) Date of Patent: Apr. 30, 2019

(54) MANAGEMENT OF SPECTRUM EMISSION REQUIREMENTS (71) Applicant: Samsung Electronics Co., Ltd., Suwon-si, Gyeonggi-do (KR)

(72) Inventors: Gert-Jan Van Lieshout, Middlesex (GB); Himke Van Der Velde, Middlesex (GB); Soeng Hun Kim, Yongin-si (KR); Xutao Zhou, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 552 days.

(21) Appl. No.: 14/347,830

(22) PCT Filed: Sep. 28, 2012

(86) PCT No.: PCT/KR2012/007944
§ 371 (c)(1),
(2) Date: Mar. 27, 2014

(87) PCT Pub. No.: WO2013/048198
PCT Pub. Date: Apr. 4, 2013

(65) Prior Publication Data
US 2014/0248889 A1 Sep. 4, 2014

Related U.S. Application Data (60) Provisional application No. 61/541,528, filed on Sep. 30, 2011.

(51) Int. Cl.
*H04W 28/18* (2009.01)
*H04W 36/00* (2009.01)
*H04W 48/10* (2009.01)

(52) U.S. Cl.
CPC ....... *H04W 28/18* (2013.01); *H04W 36/0083* (2013.01); *H04W 36/0058* (2018.08); *H04W 48/10* (2013.01)

(58) Field of Classification Search
CPC .. H04W 28/18; H04W 48/10; H04W 36/0083
See application file for complete search history.

(56) References Cited

U.S. PATENT DOCUMENTS

2006/0126536 A1* 6/2006 Patel ................. H04L 45/02
370/254
2006/0142032 A1* 6/2006 Derakhshan ......... H04W 36/30
455/509

(Continued)

FOREIGN PATENT DOCUMENTS

EP 1 359 781 B1 11/2003
WO 2010/082888 A1 7/2010

(Continued)

*Primary Examiner* — Qun Shen
(74) *Attorney, Agent, or Firm* — Jefferson IP Law, LLP (57) ABSTRACT

A user equipment (2) has an ability to operate according to one or more spectrum emission requirement capability values (14) in a wireless communications network having at least a first serving cell (4). A message (6) is received at the user equipment (2) from the first serving cell (4) comprising a first indicator representing a first band designation (8), a second indicator representing a spectrum emission requirement value (10), and at least one additional indicator representing at least one additional spectrum emission requirement value (12), both the first and additional indicators relating to the first band designation. The user equipment (2) performs a comparison of the first and additional spectrum emission requirement values (10, 12) with the one or more spectrum emission requirement capability values (14) and determines a behavior of the user equipment (2) in relation to the first serving cell (4) in dependence on the comparison.

10 Claims, 6 Drawing Sheets (56) References Cited

U.S. PATENT DOCUMENTS

| | | | |
|---|---|---|---|
| 2008/0025254 A1* | 1/2008 | Love | H04W 52/242 370/329 |
| 2009/0023434 A1* | 1/2009 | Trainor | H04W 4/02 455/418 |
| 2010/0041339 A1* | 2/2010 | Miller, II | H04W 24/00 455/62 |
| 2010/0118805 A1 | 5/2010 | Ishii et al. | |
| 2010/0311426 A1 | 12/2010 | Muller | |
| 2010/0317356 A1* | 12/2010 | Roessel | H04W 72/0406 455/450 |
| 2011/0182234 A1* | 7/2011 | Kitazoe | H04W 48/18 370/328 |
| 2012/0034917 A1* | 2/2012 | Kazmi | H04W 48/16 455/434 |
| 2012/0170534 A1* | 7/2012 | Kim | H04H 20/42 370/329 |
| 2013/0143502 A1* | 6/2013 | Kazmi | H04W 88/06 455/62 |

FOREIGN PATENT DOCUMENTS

| | | |
|---|---|---|
| WO | 2011/014842 A1 | 2/2011 |
| WO | 2011/018021 A1 | 2/2011 |

\* cited by examiner

SIB2-1] State of the art:

SIB2-2] Solution A:

SIB2-3] Solution B:

SIB2-4] Cell belonging to multiple bands, Solution A:

SIB2-5] Cell belonging to multiple bands, Solution B:

[Fig. 10]
NFL-1] State of the art:

NFL-2] Solution A:

NFL-3] Solution B:

NFL-4] Cell belonging to multiple bands, Solution A:

NFL-5] Cell belonging to multiple bands, Solution B:

MANAGEMENT OF SPECTRUM EMISSION REQUIREMENTS

TECHNICAL FIELD

The present invention relates generally to wireless communications systems, and more specifically, but not exclusively, to management of spectrum emission requirements for user equipment in a cellular wireless communications system.

BACKGROUND ART

Modern wireless communications systems, and in particular cellular wireless communications systems, such as the Third Generation Partnership Project (3GPP) Long Term Evolution (LTE) system using Evolved Universal Terrestrial Radio Access (E-UTRA), may place a requirement on the spectrum emission requirements of radio equipment that depends on the territory in which the system is deployed and on the operating frequency band designation. For example, there may be more sensitive radio technology operating at neighbouring frequencies in some deployment situations and not in others, and so there may be a more or less stringent demands placed on the emissions in some deployment situations than in others. A user equipment may be capable of operating according to a number of different spectrum emission requirement capabilities, which may include out of band emission requirement capabilities, and a serving cell in a wireless communications network may signal a spectrum emission requirement value to a user equipment to instruct it to operate according to that value for a given frequency band designation. Typically, a user equipment may need to operate at a lower output power in order to achieve a more stringent spectrum emission requirement, which may limit the coverage and throughput of the system, so it is typically a disadvantage to apply a more stringent spectrum emission requirement value than is necessary in a given deployment.

The current handling of spectrum emission requirement in the LTE system, introduced from 3GPP LTE Release 8, supports the definition of multiple "NS" values (Network Signalled) for a band designation. The NS values correspond to a spectrum emission requirement value in addition to the minimum emission requirement specified for a user equipment. By broadcasting an NS value in a cell, an operator can force the user equipment to comply to more stringent spectrum emission requirements if, for example, a sensitive radio technology is neighbouring the operators deployment in a certain country. Besides spectrum emission requirements, the NS value may also affect A-MPR (Additional Maximum Power Reduction).

One requirement for conventional systems when defining an NS value and a corresponding spectrum emission requirement value for a band designation is that all user equipments supporting that band designation may have to support all NS values defined for this band. As a result, it is typically not possible with conventional systems to define additional NS values for existing band designations for which user equipments already exist in the field.

This may be a disadvantage, for example, if after a band designation is defined a new operator in a different country from that for which the band designation was originally defined may have the same spectrum available and also may want to start deploying LTE in that spectrum. However in this different country, there may be a sensitive technology neighbouring this spectrum and additional spectrum emission requirements may have to be defined if this band designation is to be used. So, in conventional systems the use of this spectrum using the same band designation may not be possible.

DISCLOSURE OF INVENTION

Technical Problem

In another example, there may be overlapping band designations, and it may be desirable to allow a cell to broadcast information that it is part of multiple band designations. For example, it may be desirable to allow a visiting user equipment capable of operating in a given band to have access in a cell operating in another band designation, but it may be necessary to require the user equipment to operate at a NS value not originally defined for the given band designation. In conventional systems this may not be possible, since it is typically not possible to define additional NS values for existing bands for which UEs already exist in the field.

It is an object of the invention to mitigate the problems of the prior art.

Solution to Problem

In accordance with a first aspect of the present invention, there is provided a method of operating a user equipment in a wireless communications network, the user equipment having a capability to operate according to one or more spectrum emission requirement capability values, and the wireless communications network having at least a first serving cell, the method comprising:

receiving, at the user equipment, a message from the first serving cell comprising a first indicator representing a first band designation, a second indicator representing a spectrum emission requirement value, and at least one additional indicator representing at least one additional spectrum emission requirement value, both the first and additional indicators relating to the first band designation;

performing a comparison of the first and additional spectrum emission requirement values with said one or more spectrum emission requirement capability values; and determining a behaviour of the user equipment in relation to the first serving cell in dependence on said comparison.

This has an advantage that the additional spectrum requirement value may be used to determine the behaviour of the user equipment, so that an additional spectrum emission requirement value may be introduced by a network operator, and a user equipment may determine its behaviour according to its spectrum emission capability values. For example, new user equipment supporting more spectrum emission capability values than legacy user equipment may have different determined behaviour from the legacy equipment.

In an embodiment of the invention, the determined behaviour comprises:

selecting one of the one or more spectrum emission requirement capability values dependent on said comparison; and operating the user equipment according to the selected spectrum emission requirement capability value.

This has an advantage that multiple spectrum emission requirements can be used in parallel in a cell by different user equipments.

In an embodiment of the invention, said selecting comprises:

dependent on one of the one or more spectrum emission requirement capability values being equivalent to said at least one additional spectrum emission requirement value, selecting the one of the one or more spectrum emission requirement capability values that is equivalent to said at least one additional spectrum emission requirement value.

This has an advantage that that multiple spectrum emission requirements can be used in parallel in a cell by different user equipments.

In an embodiment of the invention, said selecting comprises:

determining a preference rating for each of the one or more spectrum emission requirement capability values that is determined to be equivalent to the first or at least one additional spectrum emission requirement value by said comparison; and selecting the one of the one or more spectrum emission requirement capability values having the most preferable of the determined preference ratings.

This has an advantage that the network operation may be simplified, since the user equipment may select a spectrum requirement capability value according to which to operate.

In an embodiment of the invention, the preference rating is based on a degree of stringency of a spectrum emission requirement.

This has the advantage that, for example, the most stringent spectrum emission requirement may be imposed, so as to improve the emission characteristics of the wireless system.

In an embodiment of the invention, said determining a preference rating comprises calculating the preference rating based on spectrum emission specifications held at the user equipment.

This has an advantage that signalling overhead is reduced, since the user equipment may determine the preference rating on the basis of information held at the user equipment.

In an embodiment of the invention, said determining a preference rating comprises receiving an indication of preference rating from the first serving cell for at least said at least one additional spectrum emission requirement value.

This has an advantage that the preference rating may be controlled by the network.

In an embodiment of the invention, said indication of preference rating comprises an order in a sequence of spectrum emission requirement values.

This has an advantage that the preference rating may be signalled by the network with reduced signalling overhead.

In an embodiment of the invention, the method further comprises:

receiving, at the user equipment, a message from the first serving cell comprising a second indicator representing a second band designation, and at least one further indicator representing at least one further spectrum emission requirement value relating to the second band designation, the first and second band designations being for use with the first serving cell;

selecting a spectrum emission requirement value for use with the first serving cell on the basis of a preference rating of each of the at least one additional spectrum emission requirement value and the at least one further spectrum emission requirement value.

This has the advantage that a spectrum emission requirement value may be selected in a situation in which a cell operates according to two band designations, for example to allow operation of a visiting user equipment operating according to the second band designation.

In an embodiment of the invention, the preference rating is related to a degree of stringency of the spectrum emission requirements.

In an embodiment of the invention, the method comprises determining a preference rating based on spectrum emission specifications held at the user equipment.

This has an advantage of reducing signalling requirements.

In an embodiment of the invention, the method comprises determining a preference rating based on receiving an indication of preference rating from the first serving cell for at least said at least one additional spectrum emission requirement value and for the at least one further spectrum emission requirement value.

This has an advantage that the preference rating may be under the control of the network In an embodiment of the invention, the determined behaviour comprises:

in dependence on the first serving cell having the first band designation, inhibiting camping of the user equipment on the first serving cell in dependence on said at least one additional spectrum emission requirement value not being equivalent to any of the one or more spectrum emission requirement capability values.

This has an advantage that user equipment may be prevented from camping in a cell if it cannot meet a spectrum emission requirement for the cell, so improving the emission performance of the wireless communications system.

In an embodiment of the invention, the determined behaviour comprises:

inhibiting measurements on neighbouring cells having a frequency corresponding to a frequency of the first serving cell in dependence on said inhibiting of camping of the user equipment on the first serving cell.

In an embodiment of the invention, the at least one additional spectrum emission requirement value applicable to the first serving cell is used as a spectrum emission requirement value for a neighbouring cell having a frequency corresponding to a frequency of the first serving cell.

This has an advantage that behaviour of the network may be simplified, by the assumption that frequencies corresponding to a given band designation have the same spectrum emissions requirement.

In an embodiment of the invention, said at least one additional spectrum emission requirement value is a value in a neighbouring frequency list.

In an embodiment of the invention, the determined behaviour comprises:

inhibiting measurements on a frequency corresponding to that of a neighbouring cell in dependence on none of the additional spectrum emission requirement values being equivalent to a said spectrum emission requirement capability value.

This has an advantage of preventing unnecessary measurements, saving network resource, and also preventing handover to a neighbouring call having a spectrum emission requirement that a user equipment cannot meet.

According to a second aspect of the invention there is provided a user equipment for use in a wireless communications network, the user equipment having a capability to operate according to one or more spectrum emission requirement capability values, and the wireless communications network having at least a first serving cell, the user equipment being arranged to:

receive, at the user equipment, a message from the first serving cell comprising a first indicator representing a first band designation, a second indicator representing a spectrum emission requirement value, and at least one additional indicator representing at least one additional spectrum emission requirement value, both the first and additional indicators relating to the first band designation;

perform a comparison of the first and additional spectrum emission requirement values with the one or more spectrum emission requirement capability values; and determine a behaviour of the user equipment in relation to the first serving cell in dependence on said comparison.

According to a third aspect of the invention there is provided a method of operating a wireless communications network, for use with a first type of user equipment having a capability to operate according to a first plurality of spectrum emission requirement capability values and a second type of user equipment having a capability to operate according to a second plurality of spectrum emission requirement capability values, the wireless communications network having at least a first serving cell, the method comprising:

sending a message to the user equipment from the first serving cell comprising a first indicator representing a first band designation, a second indicator representing a spectrum emission requirement value and at least one additional indicator representing at least one additional spectrum emission requirement value, both the first and additional indicators relating to the first band designation, whereby a user equipment of a the first type may operate according to the spectrum emission requirement value indicated by the second indicator, and a user equipment of a the second type may operate according to the spectrum emission requirement value indicated by the at least one additional spectrum emission requirement value.

This has an advantage that the wireless communications network may operate with both user equipment of a first type, such as legacy equipment, and user equipment of a second type, such as new user equipment. The new user equipment may, for example, operate according to a more stringent spectrum emission requirement than the legacy user equipment, thereby allowing the network to improve its emission performance over time as legacy equipment is replaced. Alternatively, the new user equipment may, for example, operate according to a less stringent spectrum emission requirement than the legacy user equipment, thereby allowing the coverage and throughput of the new user equipment to be improved.

According to a fourth aspect of the invention there is provided a wireless communications network for use with a first type of user equipment having a capability to operate according to a first plurality of spectrum emission requirement capability values and a second type of user equipment having a capability to operate according to a second plurality of spectrum emission requirement capability values, the wireless communications network having at least a first serving cell, the wireless communications network being arranged to:

send a message to the user equipment from the first serving cell comprising a first indicator representing a first band designation, a second indicator representing a spectrum emission requirement value and at least one additional indicator representing at least one additional spectrum emission requirement value, both the first and additional indicators relating to the first band designation, whereby a user equipment of a the first type may operate according to the spectrum emission requirement value indicated by the second indicator, and a user equipment of a the second type may operate according to the spectrum emission requirement value indicated by the at least one additional spectrum emission requirement value.

According to a fifth aspect of the invention there is provided a method of operating a user equipment in a wireless communications network, the user equipment having a capability to operate according to a plurality of spectrum emission requirement capability values, and the wireless communications network having at least a first serving cell, the method comprising:

transmitting, from the user equipment, a message to the first serving cell indicating one or more spectrum emission requirement capability values for a band designation; and receiving, from the first serving cell, an instruction to perform measurements in a cell selected in dependence on the first message.

This has an advantage that the network may determine behaviour of the user equipment, such as handover, in accordance with the spectrum emission requirement capabilities of the user equipment, so for example it may determine that the user equipment should not be handed over to a cell that requires a spectrum emission requirement capability value that the user equipment does not support.

In an embodiment of the invention, said message is a user equipment capability signalling message.

This is a convenient way to convey the one or more spectrum emission requirement capability values to the network.

According to a sixth aspect of the invention there is provided a user equipment for use in a wireless communications network, the user equipment having a capability to operate according to one or more spectrum emission requirement capability values, and the wireless communications network having at least a first serving cell, the user equipment being arranged to:

transmit, from the user equipment, a message to the first serving cell indicating one or more spectrum emission requirement capability values for a band designation; and receive, from the first serving cell, an instruction to perform measurements in a cell selected in dependence on the first message.

According to a seventh aspect of the invention there is provided a method of operating a wireless communications network for use with a user equipment having a capability to operate according to one or more spectrum emission requirement capability values, the wireless communications network having at least a first serving cell, the method comprising:

receiving, from the user equipment, a message indicating one or more spectrum emission requirement capability values of the user equipment for a band designation; and sending an instruction to the user equipment determined in dependence on processing of the first message.

In an embodiment of the invention, the method comprises:

determining a cell to which the user equipment may be handed over on the basis of the one or more spectrum emission requirement capability values of the user equipment and spectrum emission requirement values of candidate cells for handover, wherein sending said instruction comprises:

sending, to the user equipment, an instruction to perform measurements in at least the determined cell.

This has an advantage that the network may determine a cell on which the user equipment may perform measurements, and to which the user equipment may be handed over, on the basis of the spectrum emission requirement capability values of the user equipment, so that the user equipment is not handed over to a cell having spectrum emission requirements that it cannot comply with.

In an embodiment of the invention, the method comprises:

determining a spectrum emission requirement value required for the first serving cell, wherein sending said instruction comprises:

sending, to the user equipment, an indication of a spectrum emission requirement value for use at the first serving cell.

According to an eighth aspect of the invention there is provided a wireless communications network for use with a user equipment having a capability to operate according to one or more spectrum emission requirement capability values, the wireless communications network having at least a first serving cell, the wireless communications network being arranged to:

receive, from the user equipment, a message indicating one or more spectrum emission requirement capability values of the user equipment for a band designation; and send an instruction to the user equipment determined in dependence on processing of the first message.

Further features and advantages of the invention will be apparent from the following description of preferred embodiments of the invention, which are given by way of example only.

Advantageous Effects of Invention

The present invention has an advantage that the additional spectrum requirement value may be used to determine the behaviour of the user equipment, so that an additional spectrum emission requirement value may be introduced by a network operator, and a user equipment may determine its behaviour according to its spectrum emission capability values.

MODE FOR THE INVENTION

By way of example, embodiments of the invention will now be described in the context of a LTE (Long Term Evolution) cellular wireless communications system operating in accordance with release 10 (REL-10) and beyond of the Evolved Universal Terrestrial Radio Access (E-UTRA) standard. However, it will be understood that this is by way of example only and that other embodiments may involve other wireless systems, operating to other releases and other standards.

The handling of spectrum emission requirements in prior art systems has several limitations which may have been acceptable when LTE was first deployed, but which are becoming restrictive as LTE becomes more and more successful and is deployed in more and more countries and spectrum deployments.

A particular limitation of the state of the art solution to handling of spectrum emission requirements is that after User Equipments (UEs) supporting a certain band are deployed in the field, it may not be possible to specify new additional emission requirement values for a given band designation. Embodiments of the invention enable the introduction of new additional spectrum emission requirement values for bands for which there are already UE's out in the field. Note that the same physical frequency band may have more than one band designation; a band designation may be a nominal band specifying a group of characteristics for that band other than frequency, such as a spectrum emission requirement.

In prior art systems it may be possible to introduce a new spectrum emission requirement value for a physical frequency band, by introducing a new band designation having the new requirement. However, this may lead to a proliferation of band designations, which is undesirable due to the added complexity and the difficulty of implementation and coordination between networks.

Figure 1:
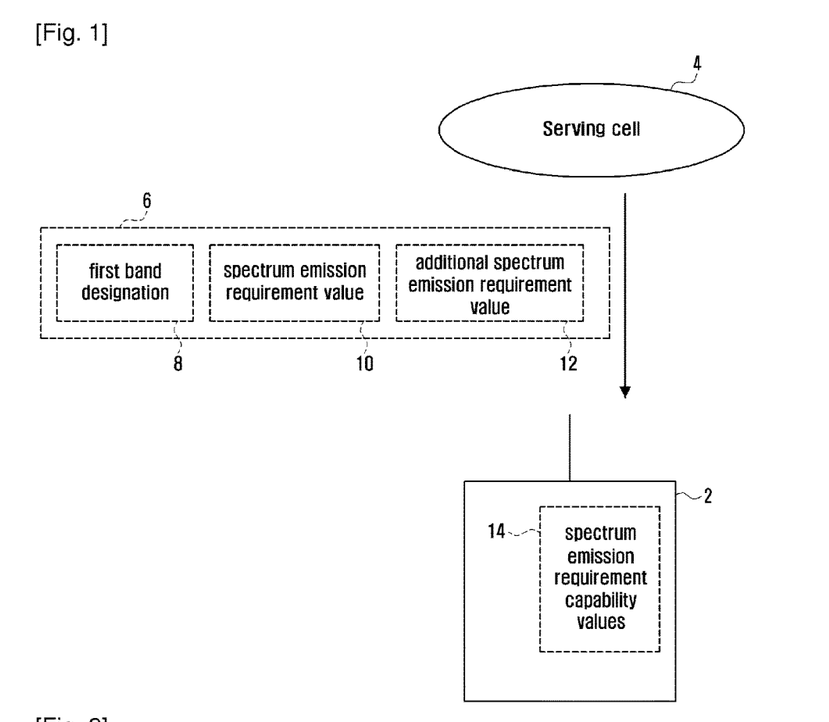
FIG. 1 is a schematic diagram showing the transmission of an additional spectrum emission requirement value in an embodiment of the invention.

FIG. 1 illustrates an embodiment of the invention. A user equipment 2 is in communication with a first serving cell 4 of a wireless communications network. The user equipment 2 has a capability to operate according to one or more spectrum emission requirement capability values 14, which may be held in memory at the user equipment. The user equipment 2 receives a message 6 from the first serving cell 4 comprising a first indicator representing a first band designation 8, a second indicator representing a spectrum emission requirement value 10, which may be a legacy signalling requirement as used in prior art systems, and according to the embodiment of the invention, at least one additional indicator representing at least one additional spectrum emission requirement value 12. Both the first 10 and additional 12 indicators relate to spectral emission requirements for the first band designation 8. This is illustrated by FIG. 2 as steps S2.1 and S2.2.

Figure 2:
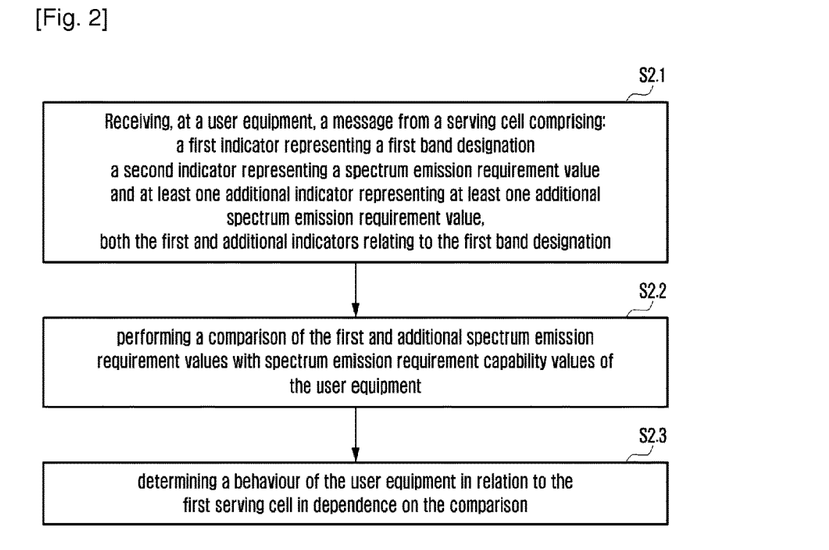
FIG. 2 is a flow diagram showing operation of a user equipment in an embodiment of the invention.

As illustrated by FIG. 2, at step S2.3 the user equipment 2 performs a comparison of the first and additional spectrum emission requirement values 10, 12 with the one or more spectrum emission requirement capability values 14 of the user equipment. The user equipment determines its behaviour in relation to the first serving cell in dependence on the comparison, so that the additional spectrum requirement value may be used to determine the behaviour of the user equipment. The additional spectrum emission requirement value may be introduced, for example, by a network operator, and the user equipment may determine its behaviour according to its spectrum emission capability values. For example, new user equipment having more spectrum emission capability values than legacy user equipment may have different determined behaviour from the legacy equipment.

The determined behaviour of the user equipment may be selecting one of the received spectrum emission requirement capability values dependent on said comparison and operating the user equipment according to the selected spectrum emission requirement capability value.

Figure 3:
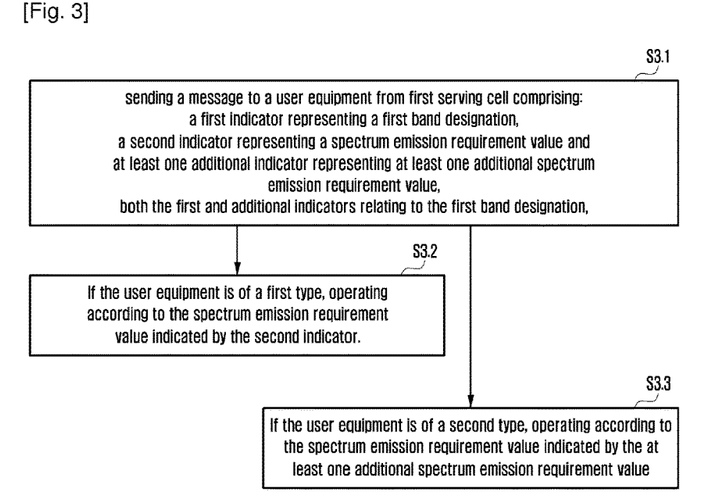
FIG. 3 is a flow diagram showing operation of a wireless network in an embodiment of the invention.

In an embodiment of the invention, that may be referred to as embodiment A, if one of the spectrum emission requirement capability values of the user equipment is found to be equivalent to a received additional spectrum emission requirement value, then the user equipment is set to operate according to that spectrum emission requirement capability value. In this case, the network may directly select the spectrum emission requirement capability value according to which user equipment operates. It may be that other, legacy, user equipment in the network cannot receive the received additional spectrum emission requirement value, and these may operate according to the received legacy spectrum emission requirement value 10, as illustrated by FIG. 3 as steps S3.1, S3.2, and S3.3.

In an embodiment of the invention, the selecting may be done by determining a preference rating for each of the spectrum emission requirement capability values that is determined to be equivalent to the first or at least one additional spectrum emission requirement value, and selecting the spectrum emission requirement capability values having the most preferable of the determined preference ratings. This allows network operation to be simplified, since the user equipment may select a spectrum requirement capability value according to which to operate without referring this decision to the network. The preference rating may be is based on a degree of stringency of a spectrum emission requirement. So, for example, the most stringent spectrum emission requirement may be imposed, so as to improve the emission characteristics of the wireless system. The preference rating may be based on spectrum emission specifications held at the user equipment, so that that signalling overhead is reduced. In an alternative embodiment, the preference rating may be determined by receiving an indication of preference rating from the first serving cell for each of the one or more additional spectrum emission requirement values. In this way, the preference rating may be controlled directly by the network. For example, the indication of preference rating received from the network may be in the form of an order in a sequence of spectrum emission requirement values. For example, the most preferable, or most stringent, may be received first, reducing signalling overhead.

In an embodiment of the invention, the serving cell may operate with two or more band designations. In this case, the user equipment may receive a message from the first serving cell comprising a second indicator representing a second band designation, and at least one further indicator representing at least one further spectrum emission requirement value relating to the second band designation, the first and second band designations being for use with the first serving cell. In this case, the user equipment may select a spectrum emission requirement value for use with the first serving cell on the basis of a preference rating of each of the at least one additional spectrum emission requirement value and the at least one further spectrum emission requirement value. As with the case of a single band designation, the preference rating may be related to a degree of stringency of the spectrum emission requirements, and as before, the preference rating may be based on spectrum emission specifications held at the user equipment. Also as before, the preference rating may be received from the first serving cell.

In an embodiment of the invention, the determined behaviour at the user equipment may be as follows. This may relate, for example, to what may be referred to as embodiment B. In this case, provided the first serving cell has the first band designation, camping of the user equipment on the first serving cell is inhibited if none of the additional spectrum emission requirement values is equivalent to any of the one or more spectrum emission requirement capability values of the user equipment. As a result, in this embodiment, the user equipment may be prevented from camping in a cell if it cannot meet a spectrum emission requirement for the cell, so improving the emission performance of the wireless communications system. Further to this behaviour, the user equipment may also inhibit measurements on neighbouring cells having a frequency corresponding to a frequency of the first serving cell, if camping of the user equipment on the first serving cell is inhibited. So, the at least one additional spectrum emission requirement value applicable to the first serving cell is used as a spectrum emission requirement value for a neighbouring cell having a frequency corresponding to a frequency of the first serving cell. In this way, behaviour of the network may be simplified, by the assumption that frequencies corresponding to a given band designation have the same spectrum emissions requirement. The one or more additional spectrum emission requirement value may be sent as a value in a neighbouring frequency list.

In an embodiment of the invention, the determined behaviour at the user equipment may comprise inhibiting measurements on a frequency corresponding to that of a neighbouring cell in dependence on none of the additional spectrum emission requirement values being equivalent to a said spectrum emission requirement capability value. This may prevent unnecessary measurements, saving network resource, and also preventing handover to a neighbouring call having a spectrum emission requirement that a user equipment cannot meet.

In an embodiment of the invention a wireless communications network may used with a first type of user equipment, for example legacy equipment, having a capability to operate according to a first set of spectrum emission requirement capability values and a second type of user equipment, for example newer equipment, having a capability to operate according to a second set of spectrum emission requirement capability values. The wireless communications network may send a message to the user equipment from a first serving cell, the message having comprising a first indicator representing a first band designation, a second indicator representing a spectrum emission requirement value and at least one additional indicator representing at least one additional spectrum emission requirement value, both the first and additional indicators relating to the first band designation. The user equipment of a the first type may operate according to the spectrum emission requirement value indicated by the second indicator, and a user equipment of a the second type may operate according to the spectrum emission requirement value indicated by the at least one additional spectrum emission requirement value. In this way, the wireless communications network may operate with both user equipment of a first type, such as legacy equipment, and user equipment of a second type, such as new user equipment. The new user equipment may, for example, operate according to a more stringent spectrum emission requirement than the legacy user equipment, thereby allowing the network to improve its emission performance over time as legacy equipment is replaced. Alternatively, the new user equipment may, for example, operate according to a less stringent spectrum emission requirement than the legacy user equipment, thereby allowing the coverage and throughput of the new user equipment to be improved.

Figure 4:
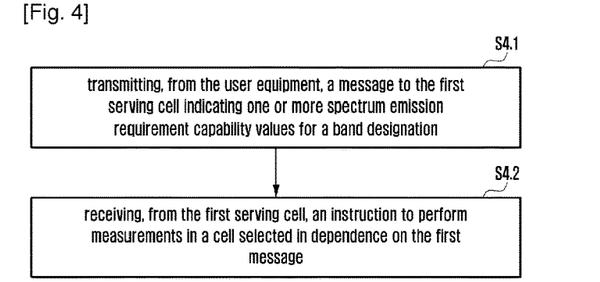
FIG. 4 is a flow diagram showing operation of a user equipment in an embodiment of the invention.

In an embodiment of the invention, the user equipment may transmit a message to the first serving cell indicating one or more spectrum emission requirement capability values for a band designation. In response, the first serving cell may send to the user equipment an instruction to perform measurements in a cell selected in dependence on the first message. In this way, the network may determine behaviour of the user equipment, such as handover, in accordance with the spectrum emission requirement capabilities of the user equipment, so for example it may determine that the user equipment should not be handed over to a cell that requires a spectrum emission requirement capability value that the user equipment does not support. The message may be message is a user equipment capability signalling message, providing a convenient way to convey the one or more spectrum emission requirement capability values to the network. This process is illustrated by FIG. 4 as steps S4.1 and S4.2.

Figure 5:
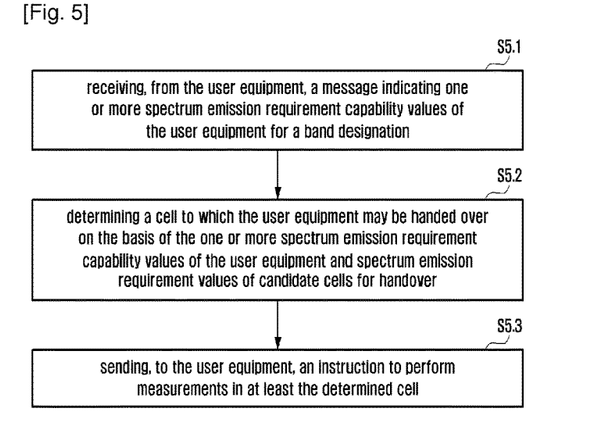
FIG. 5 is a flow diagram showing operation of a wireless network in an embodiment of the invention.

On receipt of the message from the user equipment indicating one or more spectrum emission requirement capability values of the user equipment for a band designation, the network may send, typically from the first serving cell, an instruction to the user equipment determined in dependence on processing of the first message. The wireless network may determine a cell to which the user equipment may be handed over on the basis of the one or more spectrum emission requirement capability values of the user equipment and spectrum emission requirement values of candidate cells for handover. The wireless network may send, to the user equipment, an instruction to perform measurements in at least the determined cell. In this way, the network may determine a cell on which the user equipment may perform measurements, and to which the user equipment may be handed over, on the basis of the spectrum emission requirement capability values of the user equipment, so that the user equipment is not handed over to a cell having spectrum emission requirements that it cannot comply with. This process is illustrated by FIG. 5 in steps S5.1 to S5.3.

So, as has been described in connection with embodiment A, in an embodiment of the invention, one or more new additional spectrum emission requirement values are provided for a band designation, that are processed as preferred values, that is to say desired but not mandatory values. As has been described in connection with embodiment B, in an alternative embodiment of the invention, one or more new additional spectrum emission requirement values are provided for a band designation, which processed as are mandatory minimum to support values for accessing a cell or frequency. Variants of embodiment A and embodiment B will now be described in more detail. Note that spectrum emission requirement values may be referred to as NS (Network Signalled) values.

According to embodiment A, a cell can transmit multiple NS values for a band designation. The first NS value (part of legacy signalling) is the one understood by legacy UEs and may be typically the least stringent NS value. Additional, typically more stringent, NS values can also be broadcast for a band. These one or more NS values may be referred to as additional spectrum emission requirement values. These additional NS values may be mandatory to be used for a UE, if the UE supports one of these additional NS values. A UE not supporting one of the more additional NS values can work with the less stringent NS value (and have a more impact to the sensitive neighbouring area), but UEs understanding one of the more stringent NS value have to use it in an embodiment of the invention.

So, in an embodiment of the invention, a cell may transmit multiple NS values for one band. In an embodiment of the invention, if a cell is broadcasting multiple NS values for one band, the UE is required to use the spectrum emission requirements corresponding to the most stringent NS value it supports, that is to say the UE uses a spectrum emission requirement value corresponding to a spectrum emission requirement value capability of the user equipment. This approach allows an operator, in a situation where a use of a band designation in a new situation would require a additional spectrum emission requirements, to mandate that the UEs whose spectrum emission requirement performance the operator can control by the sending additional spectrum emission requirement values (that is to say, typically not the legacy UEs) to support the stringent spectrum emission requirements. This will limit the impact to a sensitive neighbouring area, since the impact will be from predominantly roaming or legacy UEs, which may be few in number. Also in this embodiment the operator can progressively make the impact to a band less by starting to mandate support for the additional NS value for more and more terminals in subsequent years.

Figure 6:
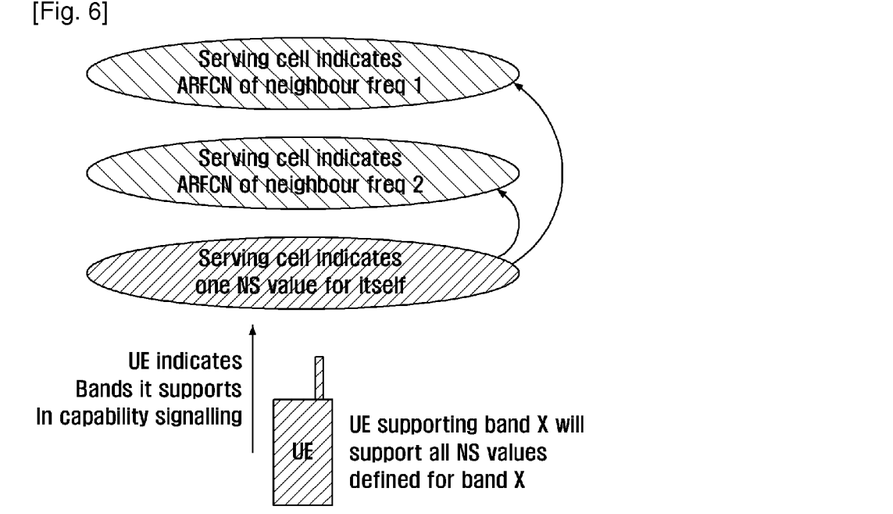
FIG. 6 illustrates operation of a user equipment in a prior art system.
Figure 7:
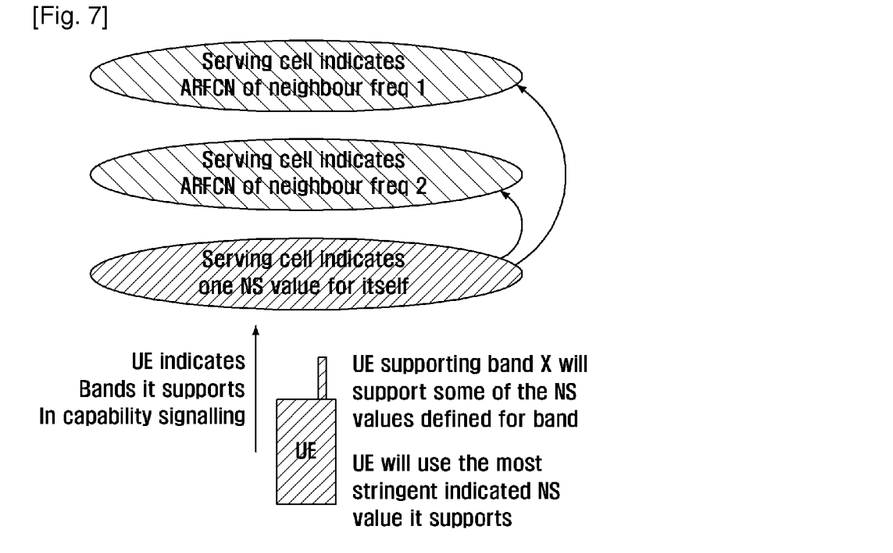
FIG. 7 illustrates operation of a user equipment in an embodiment of the invention according to embodiment A.

FIG. 6 illustrates operation of a user equipment in a prior art system, and FIG. 7 illustrates an example of operation of a user equipment in an embodiment of the invention according to embodiment A. It may be seen that in the embodiment shown in FIG. 7, there may be multiple NS values indicated by the serving cell to the user equipment, whereas in the prior art only one value of NS is indicated. Note that The Absolute Radio Frequency Channel Number (ARFCN) represents the neighbour frequency. References to "band" in FIGS. 6 to 10 refer to a band designation.

According to embodiment A, the system may operate as follows. In idle mode, a serving cell may broadcast additional NS values, that is to say one or more additional spectrum emission requirement values. The UE may have to use the most stringent NS value it supports. Note that typically it is not required to indicate NS values for neighbouring frequencies since all UEs supporting a band are typically still allowed on all frequencies of that band irrespective of NS values they support.

In connected mode, in an embodiment of the invention, as part of the information for each serving cell, typically SIB information, the UE would be informed about the NS values applicable for the serving cell, and in an embodiment of the invention may apply the most stringent NS value it receives.

The most stringent NS value may be the NS values which corresponds to the most stringent spectrum emission requirements. In an embodiment of the invention, a UE can determine which is the most stringent spectrum emission setting based on specified spectrum emission requirement values held at the user equipment. This may be explained by reference to Table 1 and table 2, which show specified spectrum emission requirement values, as follows.

Comparing the spectrum emission requirements NS_4 in Table 1 with the spectrum emission requirements NS_6 in Table 2, it can be seen that for example for 1.4 MHz the NS_4 table is less demanding since it requires only a −10 dB spectrum emission limit for the first MHz, whereas the NS_6 table requires a −13 dB limit.

TABLE 1

| Δf$_{OOB}$ (MHz) | Spectrum emission limit (dBm)/Channel bandwidth | | | | | | Measurement bandwidth |
|---|---|---|---|---|---|---|---|
| | 1.4 MHz | 3.0 MHz | 5 MHz | 10 MHz | 15 MHz | 20 MHz | |
| ±0-1 | -10 | -13 | -15 | -18 | -20 | -21 | 30 kHz |
| ±1-2.5 | -13 | -13 | -13 | -13 | -13 | -13 | 1 MHz |
| ±2.5-2.8 | -25 | -13 | -13 | -13 | -13 | -13 | 1 MHz |
| ±2.8-5.5 | | -13 | -13 | -13 | -13 | -13 | 1 MHz |
| ±5.5-6 | | -25 | -25 | -25 | -25 | -25 | 1 MHz |
| ±6-10 | | | -25 | -25 | -25 | -25 | 1 MHz |
| ±10-15 | | | | -25 | -25 | -25 | 1 MHz |
| ±15-20 | | | | | -25 | -25 | 1 MHz |
| ±20-25 | | | | | | -25 | 1 MHz |

TABLE 2

| Δf$_{OOB}$ (MHz) | Spectrum emission limit (dBm)/Channel bandwidth | | | | Measurement bandwidth |
|---|---|---|---|---|---|
| | 1.4 MHz | 3.0 MHz | 5 MHz | 10 MHz | |
| ±0-0.1 | -13 | -13 | -15 | -18 | 30 kHz |
| ±0.1-1 | -13 | -13 | -13 | -13 | 100 kHz |
| ±1-2.5 | -13 | -13 | -13 | -13 | 1 MHz |
| ±2.5-2.8 | -25 | -13 | -13 | -13 | 1 MHz |
| ±2.8-5 | | -13 | -13 | -13 | 1 MHz |
| ±5-6 | | -25 | -13 | -13 | 1 MHz |
| ±6-10 | | | -25 | -13 | 1 MHz |
| ±10-15 | | | | -25 | 1 MHz |

As a second example, considering the 20 MHz entries, the NS_4 value requires a −21 dB limit for the first MHz and NS_6 only requires a −18/13 dB limit for the first MHz. However as an example, if NS_6 had required the −25 dB limit e.g. from the 4 MHz boundary (not the actual case above), given that NS_4 only requires this from the 5 MHz boundary, then it would not have been straightforward for the UE to determine which NS value to consider most stringent. In such cases the network may signal implicitly or explicitly what NS value to consider more stringent. Signalling what NS value to consider more stringent can also resolve cases where having the UE determine the most stringent NS value would lead to different results depending on whether the UE looks at the spectrum emission requirement, the A-MPR or the spurious emission requirement.

So, in an alternative embodiment the network may signal in what order the UE should consider NS values more stringent, that is to say more preferable to use. This may be either implicitly. for example by the sequence of the NS values in the list broadcast by the cell, or explicitly, for example by indicating a preference value for each NS value.

According to embodiment B, the support for the later introduced NS values, that is to say the additional spectrum emission requirement values, may become a precondition for accessing the cell, rather than a preferred value as in embodiment A. A UE that does not support the new mandatory NS value may not be asked to measure on such a cell, and may not camp on or access such a cell.

According to embodiment B, in idle mode, a UE may not camp on a cell which only transmits an NS value(s) that the UE does not support. In an embodiment of the invention, the UE may inhibit access to a frequency related to the cell for other cells also, when the UE detects this situation.

Figure 8:
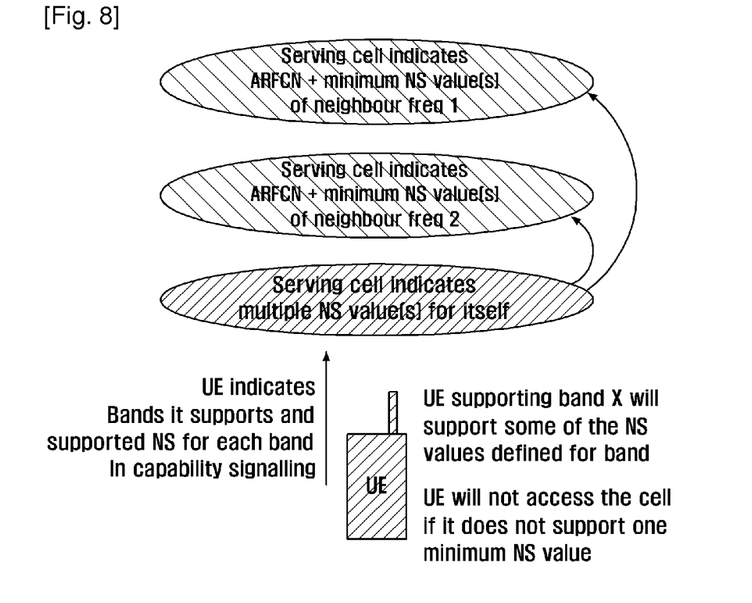
FIG. 8 illustrates operation of a user equipment in an embodiment of the invention according to embodiment B.

FIG. 8 illustrates an example of operation of a user equipment in an embodiment of the invention according to embodiment B; as may be seen from FIG. 8, in common the approach of embodiment A, there may be multiple NS values indicated by the serving cell to the user equipment, whereas in the prior art only one value of NS is indicated. It may be also seen that in the example of embodiment B shown in FIG. 8, the UE will not access the serving cell if it does not support at least one NS value transmitted by the serving cell.

As an embodiment of the invention, the inhibition of camping on a cell which only transmits an NS value(s) that the UE does not support and the inhibition access to a frequency related to the cell for other cells also may be achieved by the network for legacy UEs as follows. The network may create an error within "MIB", "SIB1" or "SIB2" signalling, for example by omitting a conditionally mandatory field or set a conditionally mandatory or mandatory field to an invalid value. That would trigger the error handling to cause the inhibition. Alternatively, "dl-Bandwith" may be set to an undefined value to cause the inhibition. For newer, non-legacy UEs an alternative field may be introduced in an extension filed that is not visible to legacy UEs.

In an alternative embodiment, the field "cellBarred" may be set to "barred", and the "intraFreqReselection" may be set to "notAllowed" and the "csg-Indication" to "FALSE". Each information element that has been set in this way for the benefit of legacy user equipment may be introduced again into an extension to be read by non-legacy user equipment. This type of mechanism may prevent a legacy UE from camping on a cell/freq with a not supported NS value, that is to say a spectrum emission requirement value that does not correspond with a spectrum emission requirement value capability of the UE.

The network may list, for each neighbouring frequency, the minimum NS value that needs to be supported by the UE to access cells on this frequency. If the UE would not support this NS value(s), then it would not measure on that frequency (save power by avoiding unnecessary measurements) nor try to reselect that cell/freq.

In an embodiment of the invention, a cell may transmit one or more "minimum NS" values, that is to say additional spectrum emission requirement values, as part frequency info in the Neighbouring Frequency list (NCL).

In an embodiment of the invention, if the UE detects a frequency indicated in the NCL and it does not support any of the minimum NS value(s), the UE will ignore this entry and not perform measurements on the corresponding frequency.

Intra-freq neighbour cells (neighbour cells at the same frequency) may be assumed to have the same NS value, that is to say the same spectrum emission requirement value. Therefore, if the UE reselects to a cell with an NS value it does not support, the UE may inhibit access to cells and measurements on the frequency.

In an embodiment of the invention, the UE assumes that intra-freq neighbour cells require the same NS values as the serving cell, so there may be no the UE may not receive information relating to NS values used by neighbouring intra-freq cells.

In connected mode, the UE may report supported NS values per band, that is to say a spectrum emission requirement capability values per band designation, in a UE capabilities message. So, in addition to signalling the band designations that it supports in UE capability signalling, the UE also indicates which NS values it supports for each band designation. The network may take NS values into account when requesting the UE to perform measurements and performing handovers; i.e. only if the UE supports at least one minimum NS value, that is to say at least one additional spectrum emission requirement value, for that frequency will the network instruct the UE to perform measurements on that frequency or perform a handover to that frequency. The UE may receive the at least one additional spectrum emission requirement value, that is to say the NS values indicated by the cell, and may use the most stringent value it supports. However in embodiment B, since the network may be aware of the NS values supported by the UE for each band, in an alternative embodiment network, that is to say the serving cell, may signal one explicit NS value that the UE should use for each serving cell. So, in an embodiment of the invention, the network configures for each serving cell (i.e. primary and secondary serving cells) the NS value to be used by the UE.

In an embodiment of the invention, a cell may be part of multiple band designations. Embodiments based on embodiment A and embodiment B may be applied in this case. If multiple band designations are supported by one cell, for each band designation additional spectrum emission requirement values which may be additional optional NS values (embodiment A) or new minimum NS value(s) (embodiment B) may be supported. In an embodiment of the invention, the UE may be select the most demanding NS value it supports across all band designations for a cell or frequency. So, in an embodiment of the invention, when multiple band designations are supported by one cell/frequency, the UE may determine the signalled spectrum emission requirements of all band designations together and for example select the NS value corresponding to the most stringent spectrum emission requirements it supports across all band designations it supports.

Figure 9:
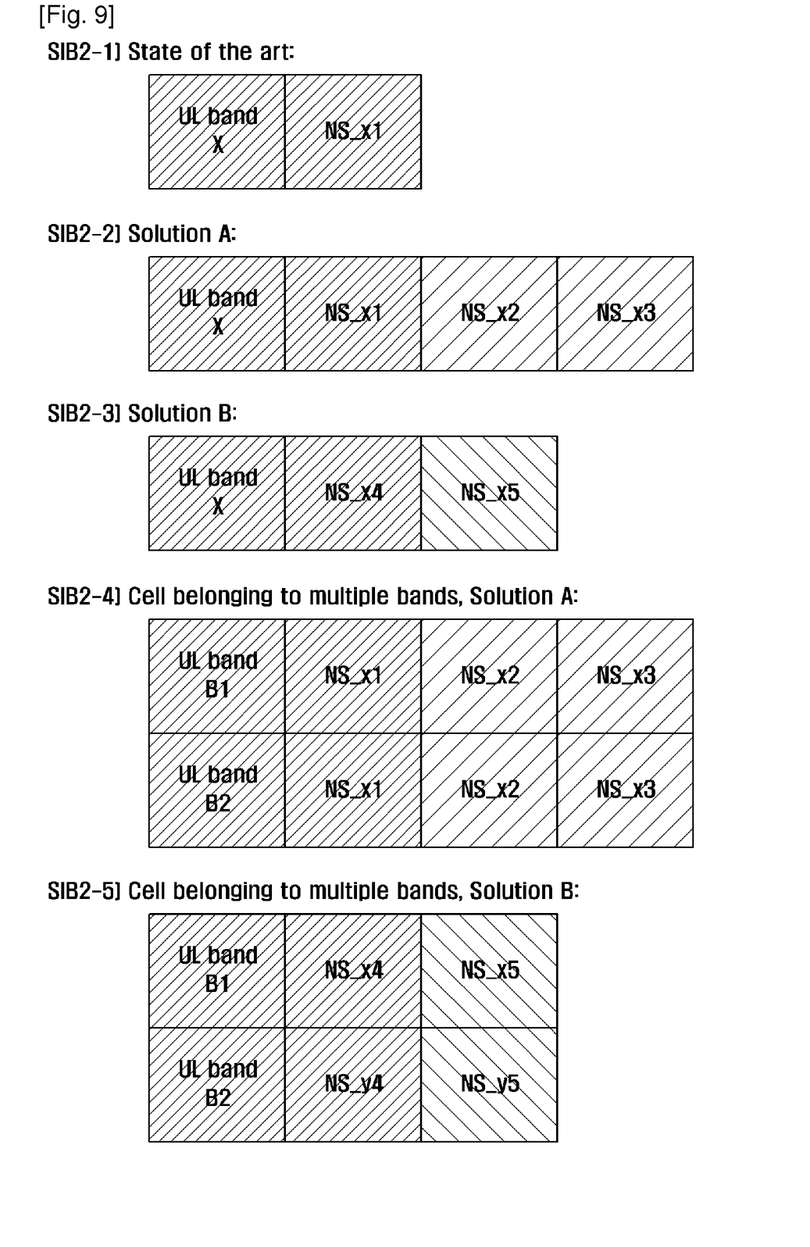
FIG. 9 shows enhancements to signalling from a serving cell according to an embodiment of the invention.

FIG. 9 provides examples of enhancements to SIB2 signalling from a serving cell with respect to spectrum emission requirements. In relation to FIG. 9, the illustrated signalling is as follows in various embodiments of the invention.

SIB2-1 illustrates the state of the art situation. A cell broadcasts max one (legacy) NS value, and all UEs will support this NS_x1 and apply it when accessing the cell.

SIB2-2 illustrates an example if Embodiment A, referred to here as solution A. A cell broadcasts max one (legacy) NS value and zero or more "nice to have" (preferred) NS values. UEs that support NS_x2 and/or NS_x3 will apply the most stringent NS value that they support of these 2 values; other UE's will apply NS_x1.

SIB2-3: illustrates an example of Embodiment B, referred to here as solution B. A cell broadcasts zero or more additional minimum required NS values. Only UEs that support either NS_x4 or NS_x5 will access the cell; UE will apply most stringent value it supports.

SIB2-4: illustrates a cell belonging to multiple bands, as an example of embodiment A. The cell broadcasts max one (legacy) NS value and zero or more "nice to have" (preferred) NS values per band. UE considers the cell part of one band (either B1 or B2) and for that band, UE's that support NS_x2 and/or NS_x3 will apply the most stringent NS value that they support of these 2 values; other UE's will apply NS_x1. Alternatively, the UE applies the NS value corresponding to the most stringent spectrum emission requirements across all bands it supports.

SIB2-5: illustrates a cell belonging to multiple bands, in an example of embodiment B. The cell broadcasts zero or more additional minimum required NS values per band. The UE considers the cell part of one band (either B1 or B2) and for that band, UEs that support NS_x4 or NS_x5 will access the cell; UE will apply most stringent value it supports. Alternatively, the UE applies the NS value corresponding to the most stringent spectrum emission requirements across all bands it supports and access the cell as long as there is one NS value it supports for one of the bands.

Figure 10:
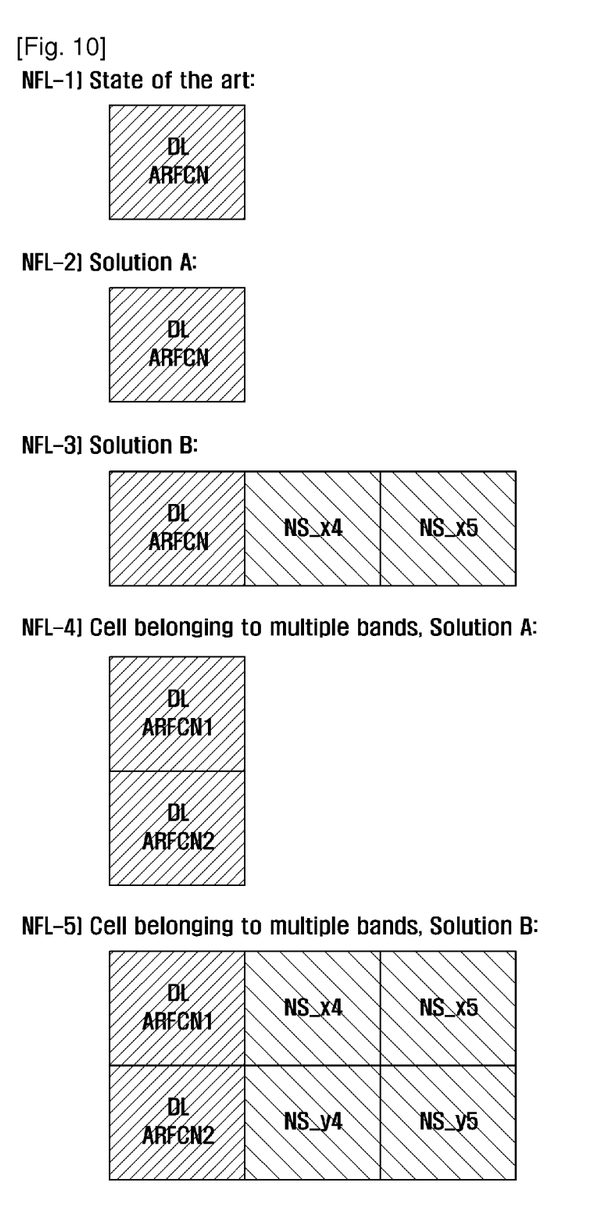
FIG. 10 shows enhancements to neighbour frequency list signalling according to an embodiment of the invention.

FIG. 10 provides examples of enhancements to Neighbour frequency list signalling from a serving cell with respect to spectrum emission requirements. In relation to FIG. 10, the illustrated signalling is as follows in various embodiments of the invention.

NFL-1: illustrates a state of the art situation. The cell broadcasts one DL ARFCN per neighbouring frequency. The UE will measure on the frequency if it supports the band.

NFL-2: illustrates an example of Embodiment A (referred to here as solution A). A cell broadcasts one DL ARFCN per neighbouring frequency. A UE will measure on the frequency if it supports the band.

NFL-3: illustrates an example of Embodiment B (referred to here as Solution B). A cell broadcasts one DL ARFCN's and zero or more NS values per neighbouring frequency. The UE will measure on the frequency if it supports at least one of the signalled NS values.

NFL-4: illustrates an example of a cell belonging to multiple bands in embodiment A. A cell broadcasts one or more DL ARFCN per neighbouring frequency. The UE will measure on the frequency if it supports one of the bands the frequency belongs to.

NFL-5: illustrates a cell belonging to multiple bands, in an example of embodiment B. A cell broadcasts one DL ARFCN's and zero or more NS values per band the neighbouring frequency belongs to. The UE will measure on the frequency if it supports at least one of the signalled NS values for one of the indicated bands.

It will be understood that user equipment and a node of a wireless network arranged to perform methods according to embodiments of the invention may comprise a processor or processing system or circuitry which may in practice be provided by a single chip or integrated circuit or plural chips or integrated circuits, optionally provided as a chipset, an application-specific integrated circuit (ASIC), field-programmable gate array (FPGA), etc. The chip or chips may comprise circuitry (as well as possibly firmware) for embodying at least one or more of a data processor or modem processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of operating by a terminal in a wireless communications system, the method comprising:
receiving, from a base station, a first message including an indicator indicating an operating frequency band, a first list of at least one first spectrum emission requirement value for the operating frequency band, a second list of at least one indicator indicating at least one additional operating frequency band, and at least one third list for the at least one additional operating frequency band, each of the at least one third list including at least one second spectrum emission requirement value with respect to corresponding additional operating frequency band;

determining whether the terminal supports the operating frequency band;

selecting the operating frequency band and applying a first listed spectrum emission requirement value supported by the terminal among the at least one first spectrum emission requirement value included in the first list for the selected operating frequency band based on a determination that the terminal supports the operating frequency band; and selecting a frequency band from the second list and applying a first listed spectrum emission requirement value supported by the terminal among the at least one second spectrum emission requirement value included in the at least one third list for the selected frequency band based on a determination that the terminal does not support the operating frequency band.

2. The method according to claim 1, wherein the at least one second spectrum emission requirement value is listed in the third list as sequentially.

3. The method according to claim 1, further comprising transmitting, to the base station, a second message including information of the spectrum emission requirement value for the selected operating frequency band or the spectrum emission requirement value for the selected frequency band.

4. The method according to claim 1, wherein the third list of the at least one second spectrum emission requirement value is information in a neighboring frequency list.

5. The method according to claim 1, wherein the first message is a system information block message.

6. A terminal in a wireless communications system, the terminal comprising:
   a transceiver; and
   a controller configured to:
      control the transceiver to receive, from a base station, a first message including an indicator indicating an operating frequency band, a first list of at least one first spectrum emission requirement value for the operating frequency band, a second list of at least one indicator indicating at least one additional operating frequency band, and at least one third list for the at least one additional operating frequency band, each of the at least one third list including at least one second spectrum emission requirement value with respect to corresponding additional operating frequency band;
      determine whether the terminal supports the operating frequency band;
      select the operating frequency band and apply a first listed spectrum emission requirement value supported by the terminal among the at least one first spectrum emission requirement value included in the first list for the selected operating frequency band based on a determination that the terminal supports the operating frequency band; and
      select a frequency band from the second list and apply a first listed spectrum emission requirement value supported by the terminal among the at least one second spectrum emission requirement value included in the at least one third list for the selected frequency band based on a determination that the terminal does not support the operating frequency band.

7. The terminal according to claim 6, wherein the at least one second spectrum emission requirement value is listed in the second list as sequentially.

8. The terminal according to claim 6, wherein the controller is further configured to:
   control the transceiver to transmit, to the base station, a second message including information of the spectrum emission requirement value for the selected operating frequency band or the spectrum emission requirement value for the selected frequency band.

9. The terminal according to claim 6, wherein the third list of the at least one second spectrum emission requirement value is information in a neighboring list.

10. The terminal according to claim 6, wherein the first message is a system information block message.

* * * * *